Nov. 3, 1953  C. H. ALLEN  2,657,525
UNIVERSAL TIME CLOCK AND HOUR ANGLE INDICATOR
Filed Jan. 24, 1951  2 Sheets-Sheet 1

Cecil H. Allen
INVENTOR.

Nov. 3, 1953  C. H. ALLEN  2,657,525
UNIVERSAL TIME CLOCK AND HOUR ANGLE INDICATOR
Filed Jan. 24, 1951  2 Sheets-Sheet 2

Cecil H. Allen INVENTOR.

Patented Nov. 3, 1953

2,657,525

UNITED STATES PATENT OFFICE 2,657,525

UNIVERSAL TIME CLOCK AND HOUR ANGLE INDICATOR

Cecil H. Allen, Colon, Panama

Application January 24, 1951, Serial No. 207,624

2 Claims. (Cl. 58—3)

This invention relates to a combined horological and astronomical or navigational device and it has for its main object to provide a device of this character, indicating the relation between time, the movement of the earth and the movement of the celestial bodies, which device is simple to construct, to handle and to read and which furnishes by direct reading the time indication for any number of locations on the earth, simultaneously permitting to set a celestial map in correlation with the terrestrial map.

A further object of the invention consists in providing a universal clock with a clock mechanism driving an hour indication chart relatively to a fixed terrestrial map without using members covering said map, said universal clock also permitting to use a sidereal map in conjunction therewith which does not cover any part of the terrestrial map and which permits the full use of the surface on which the maps are drawn.

Further objects of the invention will be apparent from the following detailed specification.

The invention is illustrated in the accompanying drawings showing one embodiment thereof by way of example. It is however to be understood that the example which has been illustrated was selected in order to explain the principle of the invention and the best mode of applying said principle. Further modes of application have not been specifically described because they may be deduced from the example illustrated by the expert skilled in the art and a departure from the example shown is therefore not necessarily a departure from the principle of the invention.

Figure 1:
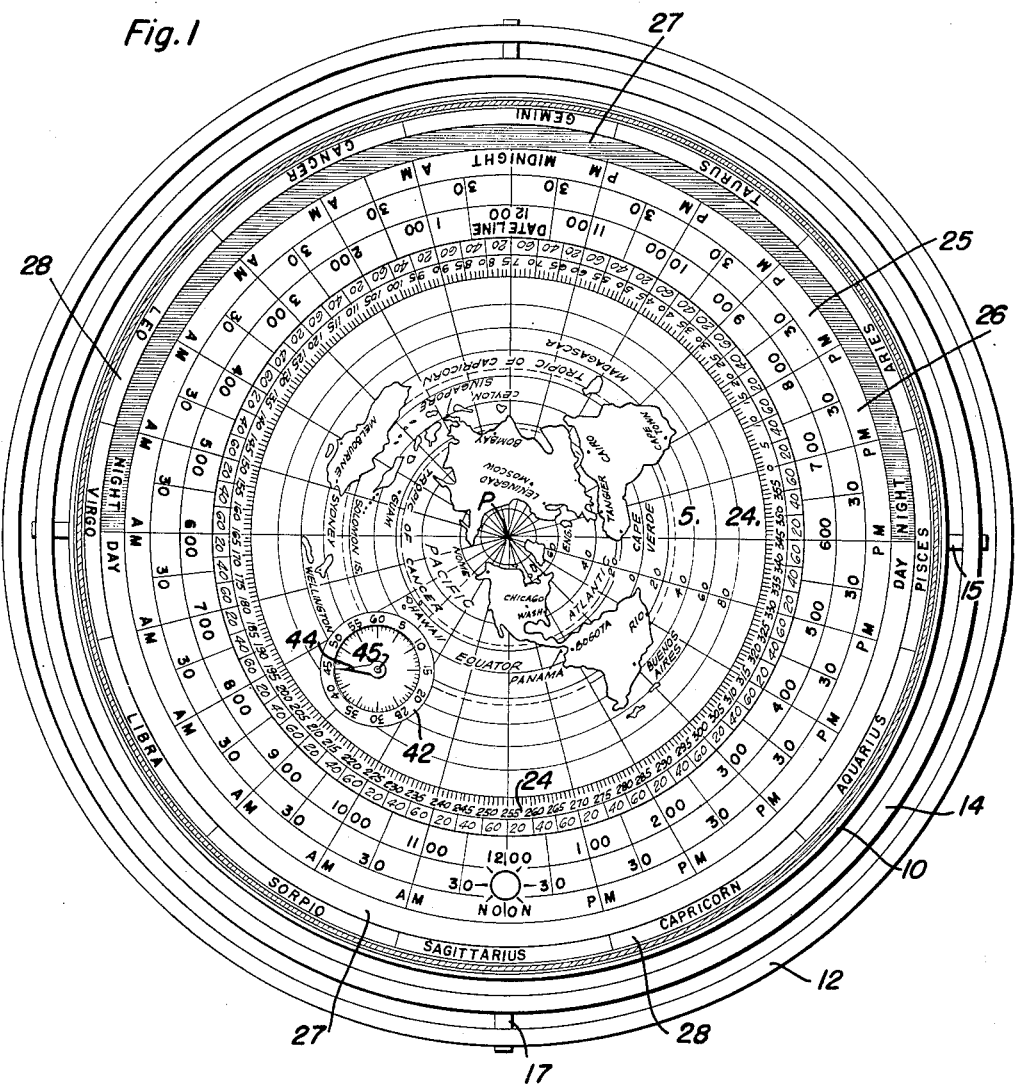
Figure 1 is a plan view of the instrument with the cap or cover removed.
Figure 2:
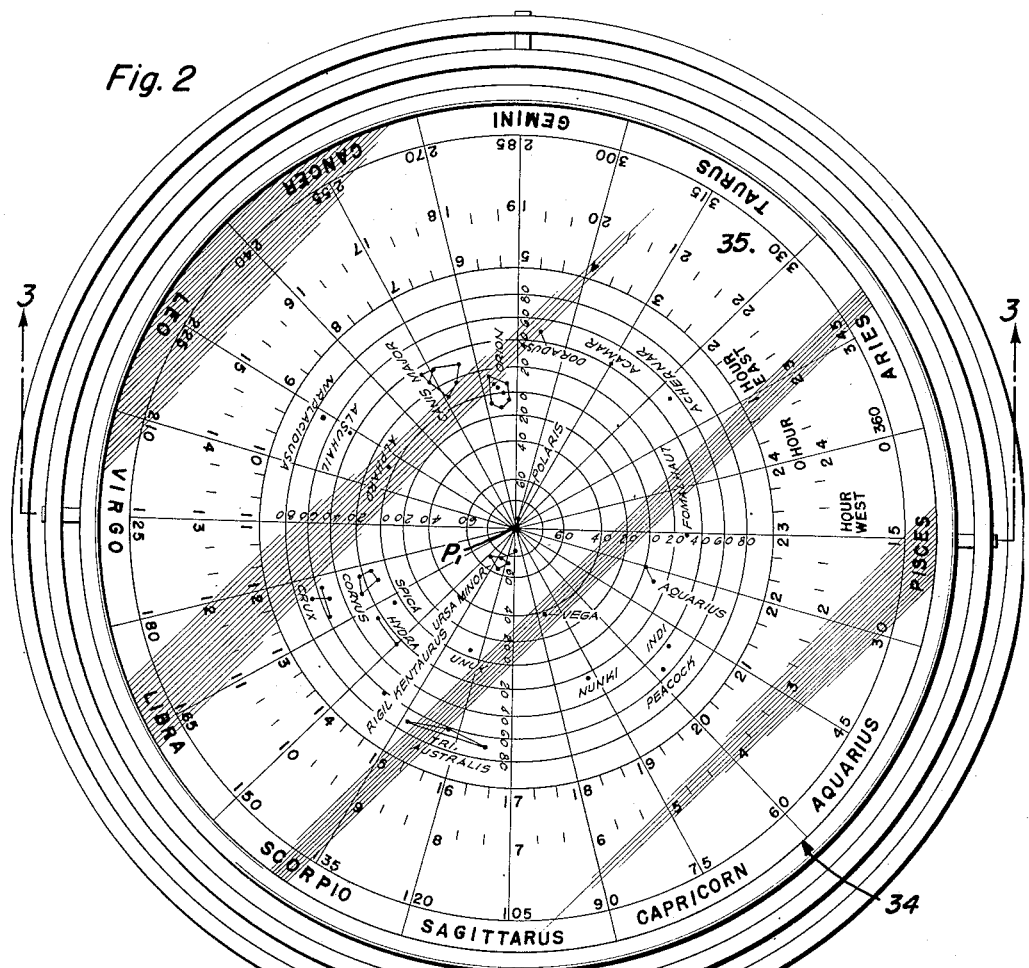
Figure 2 is a plan view of the instrument with the cap placed over the instrument, said view illustrating merely the sidereal map on the transparent cap without showing the terrestrial map which is visible through the transparent cap for the sake of clarity.
Figure 3:
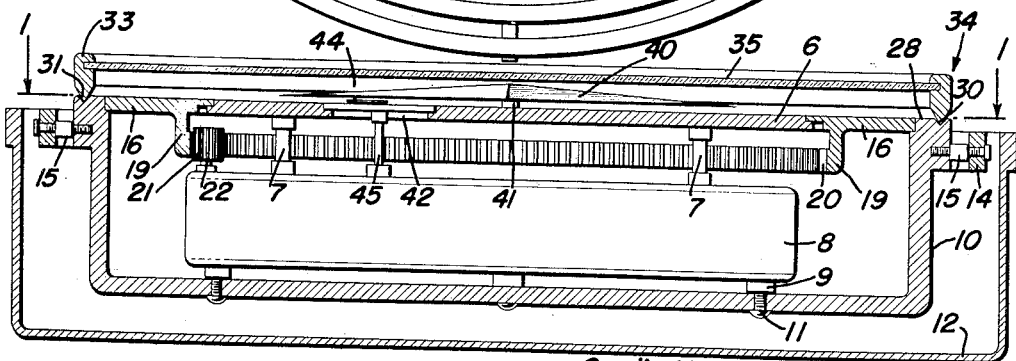
Figure 3 is an elevational sectional view through the instrument the section being taken along line 3—3 of Figure 2.

The device according to the invention comprises a fixed polar map of the earth 5 which is supported by a fixed table 6 and which is centered around a pole P. The degrees of latitude form concentric equidistant circles around the pole P while the meridians are radial straight lines radiating from the pole P. Preferably the meridians which are indicated on the map are spaced 15° from each other so that the space between two meridians is equal to a time zone. Alternatively the meridians which are found on the map may represent the controlling or basic meridians of each of the time zones and the correct time for any meridian falling into the zone between two meridians may be read by adding four minutes for each degree. A graduation scale 24 may surround the polar map indicating degrees of longitude according to any approved system (for instance, longitudes east and west of Greenwich). A second parallel graduation may indicate the number of minutes to be added to the nearest meridian marked on the map and passing west of the geographic location for which the time is to be determined.

The map preferably shows all the main geographic localities or cities whose solar time it may be desirable to know. For instance, if the map is designed for aerial navigation, it will contain cities having international airports and if designed for terrestrial navigation it will contain the main ports or those cities which are the most important centers of communications.

The table 6 is supported on pillars 7 which in their turn rest on a casing 8 housing a spring or electrically driven clock mechanism (not shown). This casing 8 is fixedly mounted within a chest or bowl 10 by means of spacing blocks 9 and screws 11.

The chest or bowl 10 is preferably suspended within an outer chest or casing 12 by means of a gimbal ring 14 supported on trunnions 15, 17 the axes of which are arranged at right angles to each other in the well known manner.

The polar map 5 with the surrounding fixed graduation forms a circular disk the center of which is the pole P and this disk is surrounded by a ring 16 the marginal portions of which are supported by the table 6 and by the bowl 10 respectively. The ring 16 is rotatable and the inner marginal portion of the ring 16 may form a protruding ledge slidably held within an inner circumferential circular recessed portion of the table 6 while the outer marginal portion of the ring 16 which may or may not be of reduced thickness may slidably fit into a recess of the bowl 10. It will thus be clear that the ring 16 will be positively guided while rotating around the center of the table 6.

The ring 16 is provided with a depending cylindrical sleeve 19 the inner side of which carries internal gear teeth 20, the gear wheel thus formed being also centered on an axis passing through the center P of the map and of the table 6. The gear with internal teeth 20 meshes with a pinion 21 carried by a shaft 22 which shaft is driven by the clockwork mechanism (not shown) housed within the casing 8.

The ratio of the gear wheels 20 and 21 is preferably so chosen that the table makes one revolution every twenty-four hours.

The said ring 16 carries a sheet 25 or a printed or engraved surface provided with a series of graduations or indicator scales. The innermost edge of the graduation sheet 25 is directly adjacent to the graduation 24 of the map 5 and the sheet is provided with a graduation preferably corresponding to or based on the graduation 24. This graduation contains the hours and, if possible, the half hours and further subdivisions of time. The annular spacing of the hours, as will be readily understood, is equal to that of the meridians which are 15° apart from each other and subdivisions are spaced accordingly. The graduations thus contains twenty-four hours with their subdivisions. To distinguish between the hours of the day and of the night an annular field 26 on the ring 16 may be reserved for a. m. and p. m. designations and this field or preferably an additional field 27 may be divided into two halves, one half being white to mark the hours of the day and the other half being dark in order to mark the hours of the night, this division being, of course, only strictly correct for localities near the equator while for other localities the indication has merely orientational value.

It will be understood that a movement of the ring 16 placing for instance the mark 1 p. m. on the meridian passing through a given locality, say Washington, D. C., indicates that this is the correct time for Washington, D. C., at this moment and corresponding indications enable the user to read the time for geographic locations or for any meridian on the map with great accuracy, if the map is of such size that it can accommodate a sufficient number of subdivisions.

The ring 16 moreover is provided with a 12:00 or noon mark and is moreover provided with a date changing mark at midnight. The latter mark permits to determine the date at a desired place which date may differ from that at the place at which the observer is located.

The upper annular face 28 of the chest or bowl 10 is likewise provided with an indication sheet or is printed or engraved and shows a division into twelve sectors, each marked with one of the names of the constellation of the zodiac for a purpose to be described.

Moreover the upper annular face 28 is provided with an annular groove 30, preferably of V-shape in cross section, into which the knife edge end 31 of a cylindrical sleeve 33 fits. The cylindrical sleeve 33 forms part of a cap 34 the upper surface of which is formed by a transparent sheet 35 which covers the map 5 and ring 16 and which, on account of its transparency, permits a reading of the indicia on the map and on the ring. On this transparent sheet 35 a celestial map showing the most prominent constellations and stars is engraved. As the map is transparent and covers the terrestrial map 5 it permits to establish correspondence between a geographic location and a star or constellation insofar as it is possible to determine directly that a given star will be in the zenith of a specific city or location at a predetermined hour. The determination that a given star or constellation will be visible at the zenith usually simplifies considerably navigational and other problems and also serves as a check up in the event that meteorological conditions block out the view of the ground.

The axis passing through the celestial pole $P_1$ must also pass through terrestrial pole P and a network of celestial meridians and circles permitting to determine the declination and azimuth of the stars is also engraved on the transparent plate or sheet 35. The spacing of the great circles is preferably the same as that on the terrestrial map the great meridian circles passing through the pole $P_1$ having an angular spacing of 15°. Separate graduations for east and west may be arranged in the zones surrounding the celestial map, each graduation being provided with appropriate subdivisions. An annular marginal section may again be subdivided into twelve segments, each segment being inscribed with the name of one of the constellations of the zodiac.

When the cap 34 carrying the transparent sheet 35 is not driven it must be placed into its correct position by the user of the device. In order to obtain correspondence in the beginning the signs of the zodiac on the transparent sheet are placed exactly over those on the upper face 28 of the bowl 10. Any further adjustment then starts from this initial position.

The device thus far described is complete and may be used in the manner specified below. It is however possible to improve it further by adding a compass needle 40 which is preferably mounted on a short axle 41, the axis of which is coincident with the pole axis. The compass is usable as such, but also provides a convenient means for finding and fixing a zero line for angular measurement.

A further improvement consists in providing a minute dial 42 permitting to read the minutes or other subdivisions of the clock time. The disk 42 with the minute dial may be mounted on any convenient place on the terrestrial map preferably on a place which is free of other indicia and it may be provided with a pointer 44 driven by an axle 45, the latter being driven in a well known manner (not shown) by gear wheels from the main shaft 22.

The use of the device will be clear from the foregoing description. The clockwork within the casing 8 rotates the ring 16 continuously by means of the gear wheels 21, 22 and the sleeve 19. The operator may select any point, for instance the point at which he happens to be, and he may read the time at the end of the meridian of this place which he has selected. Conversely he may if he has the exact solar time determine the exact meridian of the place the position of which he wants to determine. He can determine currently the time at any place on the globe at every moment at one glance, the map showing usually those locations in which he may be interested in a special case. If he has to take his bearings from the stars or if he wants to otherwise connect the position of the stars with the terrestrial map he places the cap 34 with the transparent sheet 35 over the terrestrial map in such a position that the hour indication on the graduation scale on the terrestrial map 5 and on the celestial map 35 coincide. He may then easily determine which star is in the zenith of a selected place at a given hour or is in such a position that it can be used for position determination or the like. Moreover he will be able to identify the stars and constellations much more rapidly when he knows at what hour a certain star will appear in the zenith of a point on the terrestrial map.

The cap with the celestial chart may be used as an indicator for hour angles which are directly readable on the chart. For instance by placing the celestial chart on the terrestrial map in such a way that it corresponds to existing conditions at the time and at the location when the reading is made, the hour angle can be read directly on the combined terrestrial and celestial charts.

The cap holding the sky chart may also be placed into a groove made in the rim 16 so that it may rotate with the said ring. Also in this case the hour angle is directly readable on the chart.

It will be clear that modifications of the construction may be made without in any way departing from the essence of the invention as defined by the annexed claims.

Having described the invention what is claimed as new is:

1. A device for indicating the relation between time, the movement of the earth and the celestial bodies, comprising a stationary casing, a planar circular polar terrestrial map fixedly mounted in the central portion of the device and covering said central portion, provided with a meridian network, the pole of the network being located in the center of the device, and with a graduation for said meridian network at the periphery of the circular map, a clock mechanism with a main shaft, an annular rotatable disk, surrounding said polar map and arranged in the same plane with the said polar map, said rotatable disk being provided with an hour graduation, corresponding to and adapted to co-operate with the meridian network of the polar map, said disk being rotatable around an axis passing through the pole of the terrestrial polar map, and being driven by said clock mechanism to perform one revolution within twenty-four hours, a minute dial placed on the terrestrial map, a pointer traveling over said dial, a pointer shaft, connected with said pointer, means for driving said pointer shaft from the main shaft, and a movable and removable circular cap, to be placed on the stationary casing over the terrestrial map and annular disk surrounding said map, said cap having a transparent cover sheet, parallel to the plane of the terrestrial map and covering the entire area of the terrestrial map, the graduations and indications visible on the terrestrial map and the minute dial being visible through the transparent sheet, the transparent sheet further being engraved with and showing a celestial map, adapted to be brought into correlation with the terrestrial map for an observer looking down in a direction perpendicular to the plane of the map, thus directly superposing the indications engraved on the transparent sheet on those to be seen through the transparent sheet on the terrestrial map.

2. A device for indicating the relation between time, the movement of the earth, and the movement of the celestial bodies, comprising a stationary casing, a planar circular polar terrestrial map, fixedly mounted in the central portion of the device and covering the said central portion, provided with a meridian network, the pole of the network being located in the center of the device, and further provided with a graduation for said network at the periphery of the circle, a clock mechanism with a main shaft, an annular rotatable disk surrounding said map, a gear mechanism carried by said annular disk driven by the main shaft of the clock work at the speed of one revolution for every twenty-four hours, an hour graduation and a day and night graduation carried by said annular disk, for cooperation with the meridian network and the graduation of the same, a circular guiding groove on said casing, surrounding said polar map and annular disk and concentric therewith, a movable and removable circular cap adapted to be placed over the terrestrial map and annular disk, said cap having a supporting member with a sharp edge resting on and movable within said circular guiding groove on said casing and further having a transparent cover sheet parallel to the plane of the terrestrial map and covering the entire area of the same, the graduations and indications visible on the terrestrial map being visible through the transparent sheet, the transparent sheet further being engraved with and showing a celestial map adapted to be brought into correlation with the terrestrial map for an observer looking down on both maps in a direction perpendicular to the plane of the map, thus directly superposing the indications of the transparent sheet on those of the terrestrial map.

CECIL H. ALLEN.

References Cited in the file of this patent

UNITED STATES PATENTS

| Number | Name | Date |
|---|---|---|
| 893,772 | Aufiero | July 21, 1908 |
| 2,078,345 | Robertson | Apr. 27, 1937 |
| 2,099,518 | Hazlett | Nov. 16, 1937 |
| 2,128,970 | Smyser et al. | Sept. 6, 1938 |
| 2,513,465 | Fisk | July 4, 1950 |